US010472097B2

(12) United States Patent
Gilday et al.

(10) Patent No.: US 10,472,097 B2
(45) Date of Patent: Nov. 12, 2019

(54) AIRCRAFT STATIC TEST FOR PITOT STATIC SYSTEM (71) Applicant: NAV-AIDS LTD, Montreal (CA)

(72) Inventors: Brent Duncan Gilday, Hudson (CA); Van Jean Sinnott, Brossard (CA)

(73) Assignee: NAV-AIDS LTD, Montreal, QC (CA)

( * ) Notice: Subject to any disclaimer, the term of this patent is extended or adjusted under 35 U.S.C. 154(b) by 36 days.

(21) Appl. No.: 15/746,651

(22) PCT Filed: Mar. 10, 2017

(86) PCT No.: PCT/CA2017/050325
§ 371 (c)(1),
(2) Date: Jan. 22, 2018

(87) PCT Pub. No.: WO2018/161144
PCT Pub. Date: Sep. 13, 2018

(65) Prior Publication Data
US 2019/0256225 A1    Aug. 22, 2019

(51) Int. Cl.
*B64F 5/60*    (2017.01)
*G01C 25/00*    (2006.01)
*G01P 21/02*    (2006.01)

(52) U.S. Cl.
CPC .............. *B64F 5/60* (2017.01); *G01C 25/00* (2013.01); *G01P 21/025* (2013.01)

(58) Field of Classification Search
CPC ........... B64F 5/60; G01C 25/00; G01P 21/025
See application file for complete search history.

(56) References Cited

U.S. PATENT DOCUMENTS

| 2,371,243 | A | | 3/1945 | Jordan |
| 2,897,669 | A | * | 8/1959 | Luck ...................... G01N 23/18 248/362 |
| 3,518,870 | A | | 7/1970 | Shubert et al. |
| 4,182,158 | A | | 1/1980 | Culotta et al. |
| 4,384,469 | A | | 5/1983 | Murphy |
| 4,617,826 | A | | 10/1986 | Hagen |
| 7,581,426 | B2 | * | 9/2009 | Gilday ................. H01R 13/622 73/1.29 |
| 9,995,608 | B1 | * | 6/2018 | Shintaku ............. G01M 3/2815 |
| 10,184,953 | B2 | * | 1/2019 | Wohlford .................. G01P 5/16 |
| 10,301,042 | B2 | * | 5/2019 | Piggin ...................... B64F 5/60 |
| 2007/0243012 | A1 | | 10/2007 | Gilday |

FOREIGN PATENT DOCUMENTS

| CA | 639488 A | 4/1962 |
| CA | 664982 A | 6/1963 |
| CA | 2535577 A1 | 8/2007 |

OTHER PUBLICATIONS

PCT/CA2017/050325 international search report.
PCT/CA2017/050325 Search strategy.
PCT/CA2017/050325 Written Opinion.

* cited by examiner

*Primary Examiner* — Freddie Kirkland, III
(74) *Attorney, Agent, or Firm* — Anglehart et al.

(57) ABSTRACT

An aircraft static test adapter assembly comprising a static test head for performing testing at an aircraft static port on an aircraft body. The static test head is biased, and optionally supported by a biasing member extending in use from the static test head to the ground. A biasing mechanism provides a biasing force to the biasing member which is transferred by the biasing member to the static test head such that it is held in place. Abstract not intended to be limiting.

29 Claims, 9 Drawing Sheets

AIRCRAFT STATIC TEST FOR PITOT STATIC SYSTEM

TECHNICAL FIELD

The subject matter disclosed relates generally to the field of aircraft testing and more particularly to the field of pitot-static systems testing, and more particularly still to the field of testing static ports of pitot-static systems, equipment and methods therefor.

BACKGROUND

This section is intended to provide the background for understanding the detailed description that follows. It is not intended to enlarge the scope of admitted prior art beyond what a skilled person would have beheld before reading the present description. While the background comprises prior art, it may also comprise the inventors' observations, discoveries, identification of heretofore unappreciated deficiencies or problems and insight into solving them. As such, this section may comprise description of inventive elements that is not prior art and that is not is admitted as such.

The pitot-static system is a system of pressure-sensitive instruments that is used in aviation to determine several variables related to aircraft behavior such as airspeed, altitude and altitude trend. Typically, a pitot-static system on an aircraft comprises a pitot tube, one or more static vents and pitot-static instruments. The pitot tube points directly into the airflow and receives air pressure caused by the flow. The static vent comprises a static port, which is an opening on the aircraft body at a location that is at ambient pressure such that the static port receives an air pressure generally equivalent to that of the ambient air around the aircraft. Based on the pressures provided at the pitot tube and at the static port, instruments compute certain flight-related variables such as airspeed.

Static ports are typically a flush hole on the fuselage of aircrafts. Disturbed airflow at the static port can lead to instrumental inaccuracies. As such, static ports are typically located in an area where airflow is relatively undisturbed and the static vent may include an area around the static port that is kept clean (often unpainted) to avoid disturbing airflow.

Static ports are typically located in regions where the local air pressure is equivalent to the ambient air pressure around the aircraft. Typically, this may be on a side of the fuselage. However, some factors such as side-slippage and crosswinds may affect the pressure perceived at the static port. To counter this, many aircraft comprise two static ports, one on either side of the aircraft body, allowing them to take an average pressure in order to achieve more accurate instrumental computations.

Proper functioning of the pitot-static system is critical to the safe operation of aircraft since data derived by the system, such as altitude, is safety-critical. As such, pitot-static systems are typically tested regularly to ensure proper functioning. Such tests are typically required for certification.

Figure 1A:
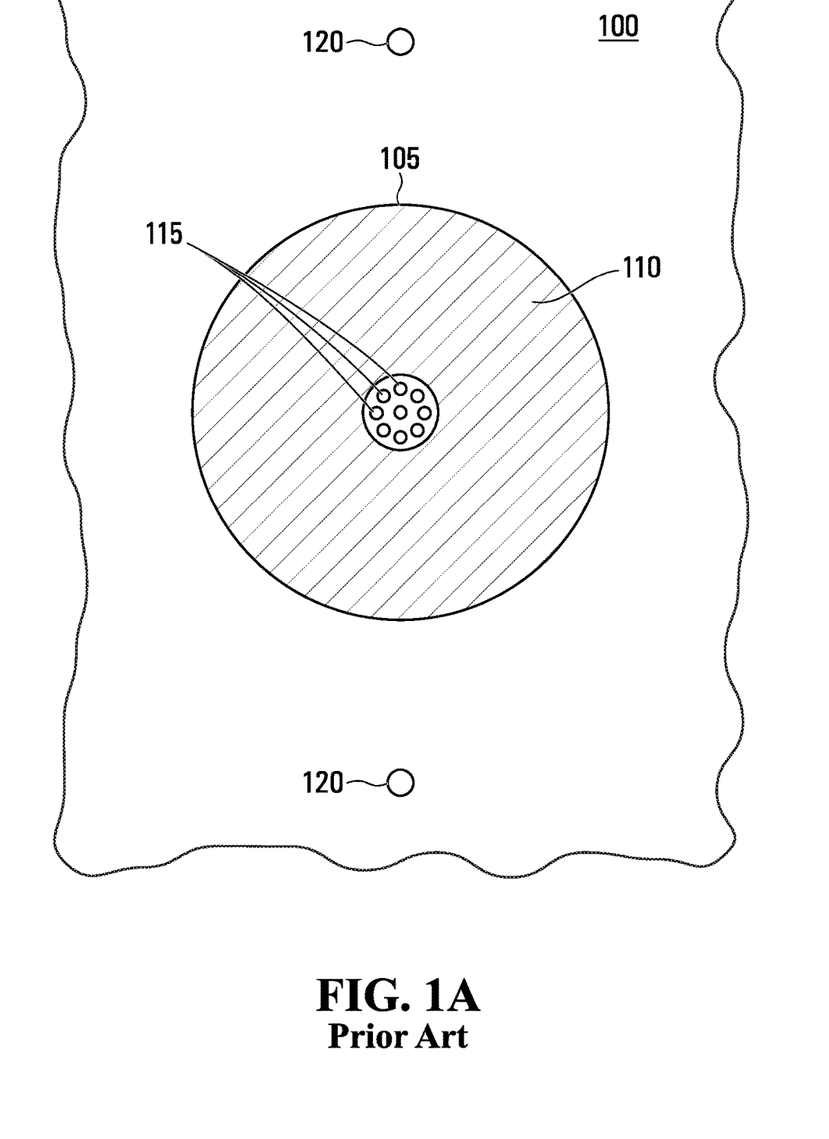
FIG. 1A shows a static vent on an aircraft body as known in the art.

As part of the pitot-static system test, equipment is typically provided on the pitot tube and/or static vent to provide pressure in the form of positive pressure or negative pressure to simulate higher or lower pressures at the pitot tube and/or static port. FIG. 1A illustrates a static vent 105 found on the fuselage of an aircraft body 100. The static vent 105 comprises a static port 115 which is an opening of the pitot static system to the exterior. The static port is located at on a part of the aircraft body where the air pressure may be used to ascertain ambient air pressure. The static vent 105 also comprises a clean body portion 110, which is an area of the aircraft body 100 surrounding the static port 115 which is kept clean and free of airflow-disrupting elements.

Typical pitot static system tests require the equipment to be affixed to the aircraft body 100 in such a way as to create a sealed passage between the test equipment and the static port 115. To that end, threaded holes 120 or the like may be provided allowing the equipment to be fastened to the aircraft body 100. This requires such threaded holes 120 to be designed into the aircraft, despite having potentially no use outside of pitot static system testing. Other equipment may use suction to hold against the aircraft body 100 which may be expensive to manufacture or be unreliable. In both cases, installation is complicated and requires accessing the static vent 105 by hand.

Figure 1B:
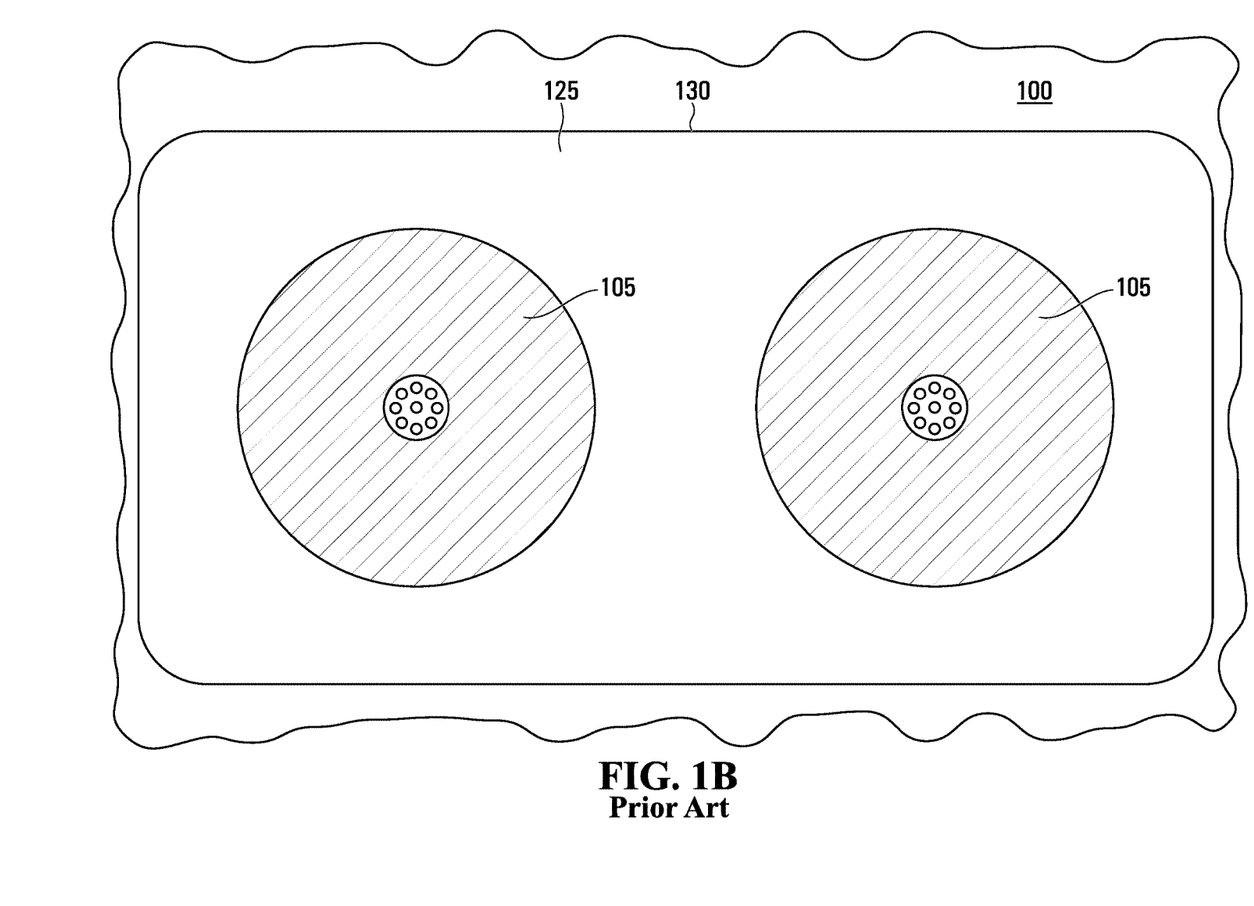
FIG. 1B shows a pair of static vents on an aircraft body as known in the art.

Oftentimes, aircraft will have multiple static vents near one another as is shown in FIG. 1B, where two static vents are provided on the side of an aircraft fuselage. Typically the static vents will be provided in a zone 125 marked by a marker 130.

SUMMARY

Provided is a novel static test adapter assembly and a method of performing static testing inter alia. In accordance with a new design, a static test adapter may comprise a static test head that is mounted on an arm which may be ground supported. The static test head comprises equipment for providing sealed communication between an air conduit providing pressure and the static port. The arm may be used to position the static test head and to support it in place. In particular, the arm may transfer a biasing force applied to the arm to the static test head to firmly hold it in place and effect a seal between the static test head and the aircraft body around the static test port. This novel equipment allows for easy installation, requires no special configuration on the aircraft and is quick to install and remove.

In accordance with certain broad embodiments, is also provided the subject matter of the claims.

In accordance with a certain embodiment is provided an aircraft static test adapter assembly for applying static test equipment to an aircraft static vent. The aircraft static test adapter assembly comprises a static test head comprising a static test opening defined about an axis adapted for communicating with an aircraft static port of an aircraft, a conduit opening for connecting to an air conduit providing pressure, and a sealed air passage defined between the static test opening and the conduit opening. The aircraft static test adapter assembly further comprises a seal in continuous contact with said static test head around said static test opening about said axis, the seal being adapted for pressing against an aircraft body around the aircraft static port to create a sealed passage between the static test opening and the aircraft static port. The aircraft static test adapter assembly further comprises a biasing arm for transmitting a force to the static test head, the biasing arm having a first end and a second end and comprising at a second end a connection for connecting to the static test head and extending longitudinal away from the second end to a first end, the first end comprising a ground contacting portion adapted for resting against a ground surface.

In accordance with another embodiment is provided a method for performing a test on an aircraft static port of an aircraft pitot-static system. The method comprises positioning a static test head having a static test opening surrounded by a seal against an aircraft body such that the seal surrounds the aircraft static port. The method further comprises positioning a biasing arm having a first end and a second end and connected to the static test head at the second end such that the first end contacts the ground. The method still further comprises biasing the biasing arm in a direction towards the aircraft body such that a biasing force is transferred to the static test head pressing the static test head against the aircraft body.

In accordance with another embodiment is provided an aircraft static test adapter assembly for applying static test equipment to an aircraft static vent. The aircraft static test adapter assembly comprises a static test head means comprising means for establishing a sealed contact between an air conduit and an aircraft static port on an aircraft body. The aircraft static test adapter assembly further comprises a biasing arm means mountable between a ground-based support to the static test head for transferring a biasing force to the static test head means. The aircraft static test adapter assembly further comprises a biasing means for providing a biasing force to the biasing arm means, the biasing force forcing the biasing arm in a direction toward the aircraft body.

BRIEF DESCRIPTION OF THE DRAWINGS

The invention will be better understood by way of the following detailed description of embodiments of the invention with reference to the appended drawings, in which.

DETAILED DESCRIPTION

Figure 2:
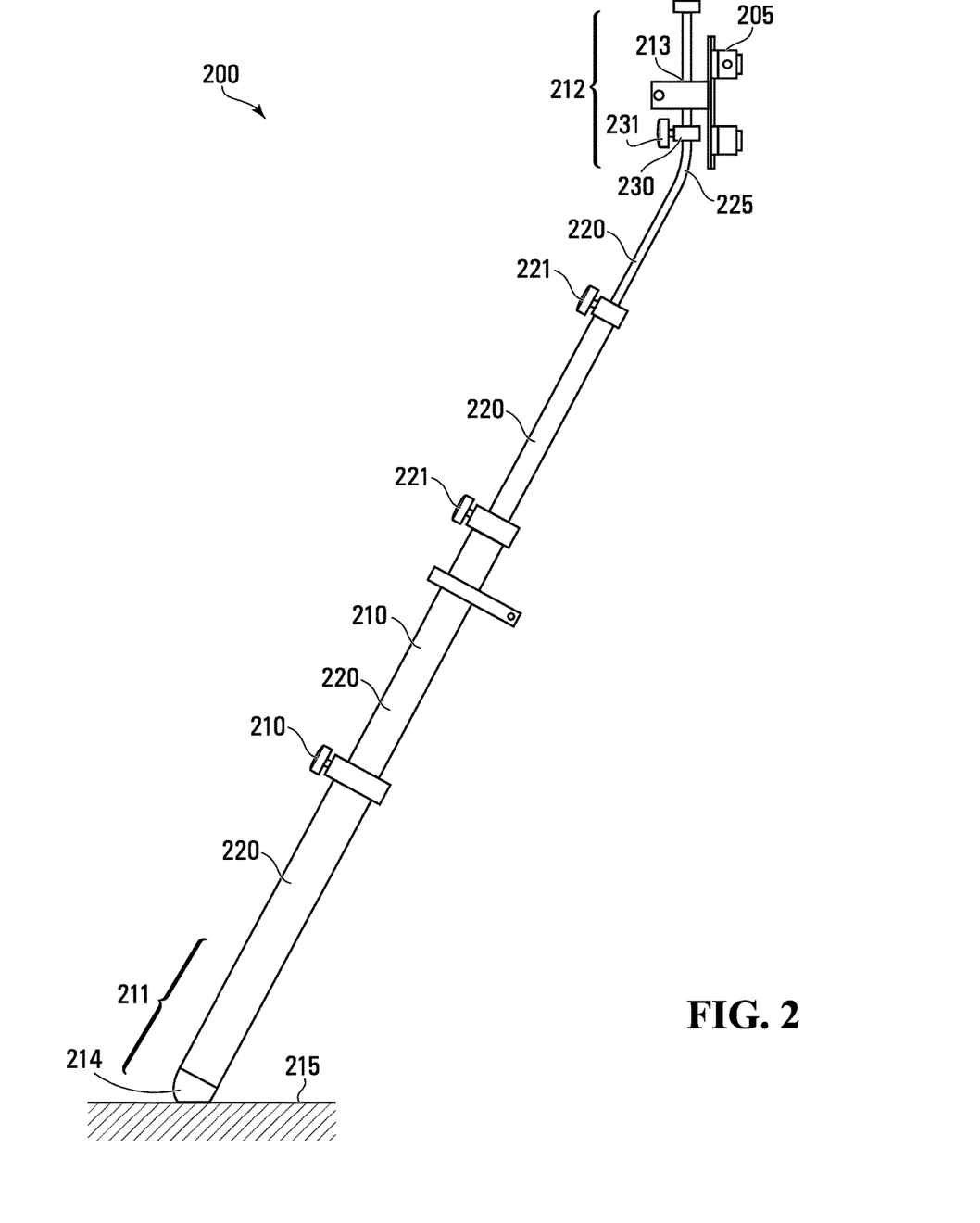
FIG. 2 shows a side elevational view of an aircraft static test adapter assembly in accordance with an exemplary embodiment.

FIG. 2 shows an aircraft static test adapter assembly 200 (or test adapter, for short) in accordance with one example of implementation. The test adapter 200 comprises a static test head 205 and a biasing arm 210.

The biasing arm 210 extends between a second end 212 and a first end 211. At the second end 212, the biasing arm 210 comprises a connection 213 connecting it to the static test head 205 while at the first end 211, the biasing arm 210 comprises a ground-contacting portion 214 configured for contacting the ground 215 and support the biasing arm 210 thereon.

The biasing arm 210 is composed of multiple inter-assembling rods 220 which connect together to extend from the second end 212 to the first end 211. In the example shown here, the biasing arm 210 is telescopic, with the inter-assembling rods 220 fitting one-within-the-other so as to slide in and out of one another. In this manner, the biasing arm can extend to give the test adapter 200a total reach of up to 2-3 meters, and in this particular example up to 2.5 meters when fully extended. Likewise, when the inter-assembling rods 220 are fully retracted within one another, the test adapter 200 retracts to a size of 0.5-2 meters and in this particular case to 1 meter, for easy storage and transportation.

Each of the inter-assembling rods 220 have an opening on one end to receive the next rod (except for the last inter-assembling rod 220 on the second end 212) and a nested end that is received within the previous rod (except for the last inter-assembling rod 220 on the first end 211). Not visible in FIG. 2, there may be mechanism to prevent inter-assembling rods 220 from slipping out of one another. For example, there may be an outwardly—protruding ring, or other enlargement or protrusion at the nested end and a matching inwardly-protruding ring or other enlargement or protrusion at the opening such that provides a blocking effect counter-acting an attempt to slide the rods completely out of one another. On the other hand the inter-assembling rods 220 may be provided with no such mechanism such that they may be fully disconnected from one another for storage and transportation. In the example shown, a tightening screw 221 is provided near the opening, where present, of each of the inter-assembling rods 220 which fits in a threaded aperture and can be tightened against the rod received inside to lock it in place. Advantageously, the telescopic configuration with tightening screws 221 allows the test adapter 200 to be adjusted to different static vent heights. In the example shown, the inter-assembling rods 220 are made of cylindrical stainless steel tubing, although it will be appreciated that other materials may be used, and that the rods can have other shapes that don't necessarily have a circular cross-section. In this case cylindrical stainless steel tubing has been used due to its strength and availability.

Although in this example, the inter-assembling rods 220 form a telescopic assembly, in other examples, other forms of assemblies are possible. For example, the inter-assembling rods 220 may be have a tent-pole configuration whereby a rod has a narrower portion at one end to fit into the next one or, conversely, a wider portion to receive the next one as is commonplace with tent poles. Optionally, an elastomeric cord may run through the biasing arm inside the inter-assembling rods from the second end rod to the first end rod such that when disassembled, the inter-assembling rods 220 are kept linked together by the elastomeric cord. Other known ways of assembling a pole may be used for the biasing arm 210, or alternatively, the biasing arm 210 may be unitary and not disassemblable. Moreover, it should be appreciated that the first end and the second end, are still considered respective ends of the biasing arm even when disassembled, e.g. for storage or transport.

The ground-contacting portion 214 of the biasing pole of this example comprises a rubber body which prevents slipping and may absorb small vibrations. In alternate implementations, the ground-contacting portion may comprise a weight such as a sandbag, or container filled with weighty material to hold the biasing arm 210 firmly in place.

At the second end 212 of the biasing arm 210, the biasing arm 210 has a connection 213 to the static test head 205. The connection 213 may be a permanent connection such as would be provided by, e.g., welding the static test head 205 to the biasing arm 210. In other embodiments, the connection 213 may be separable such that the testing head 205 may be separated from the biasing arm 210, e.g. for storage and transportation. In this embodiment, the biasing arm 210 is connected to the static test head via a moving connection, specifically here a sliding contact, whereby the static test head 205 can slide with respect to the biasing arm 210.

In some embodiments, the adapter 200 is for use with small aircraft (airplanes or helicopters) and there is vertical movement of the test ports when a person gets into or out of the aircraft and/or moves within the aircraft. It can thus be important in some embodiments to provide for a structure in the connection 213 to allow for movement, such as the sliding contact or an alternative articulation.

Figure 3:
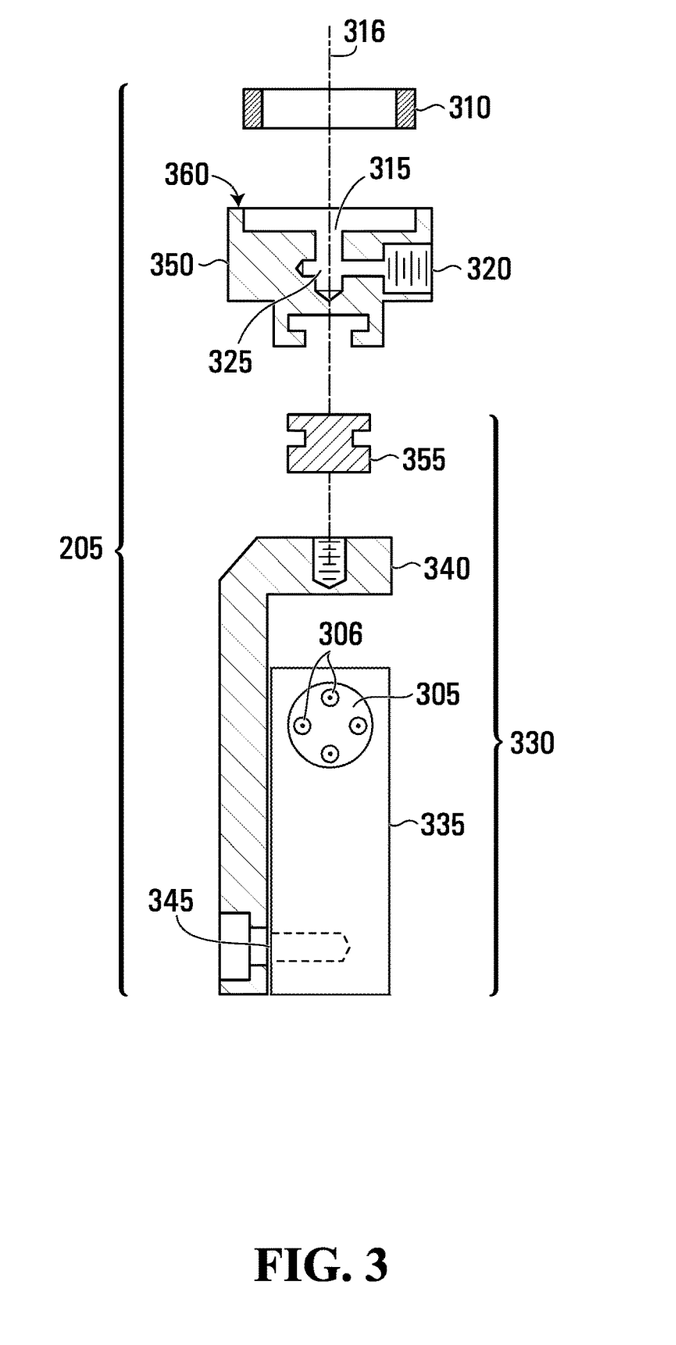
FIG. 3 shows a cross-sectional exploded view of a static test head of the aircraft static test adapter assembly of FIG. 2.

FIG. 3 shows a top cross-sectional exploded view of the static test head 205. As shown, in this embodiment the static test head comprises an arm-receiving passageway 305 which comprises balls 306 to form a bearing through which the static test head 205 can rotate about the biasing arm 210. The biasing arm 210 can slide within the passageway 305 with respect to the static test head 205 allowing vertical movement of the static test head when the test adapter 200 is installed against an aircraft. As such, slight vertical movement of the aircraft body 100, as may occur, for example, if weight is added to the aircraft during testing, can be adapted for by the static test head 205 sliding correspondingly along the biasing arm 210.

In the present example, the biasing arm 210 is adapted to be mounted vertically towards the aircraft, in that it has a substantial vertical component, but angled towards the aircraft such that it leans towards it. The biasing arm 210 is provided with a bend 225 at the second end 212. The bend 225 allows the second end 212 of the biasing arm 210 to extend more vertically to allow the static test head 205 to travel more vertically with vertical movement of the aircraft. At the same time, the bend 225 also provides a stopping mechanism preventing the static test head 225 from sliding away from the second end 212 of the biasing arm 210 and/or off the inter-assembling rod 220 on which it is installed when the inter-assembling rods 220 are disassembled. Other stopping mechanisms may be provided as would be known to a person skilled in the art. In one alternate example, a stopper such as a ring or enlargement provided on the biasing arm 210 may be used instead of, or on top of, the bend 225.

Figure 8:
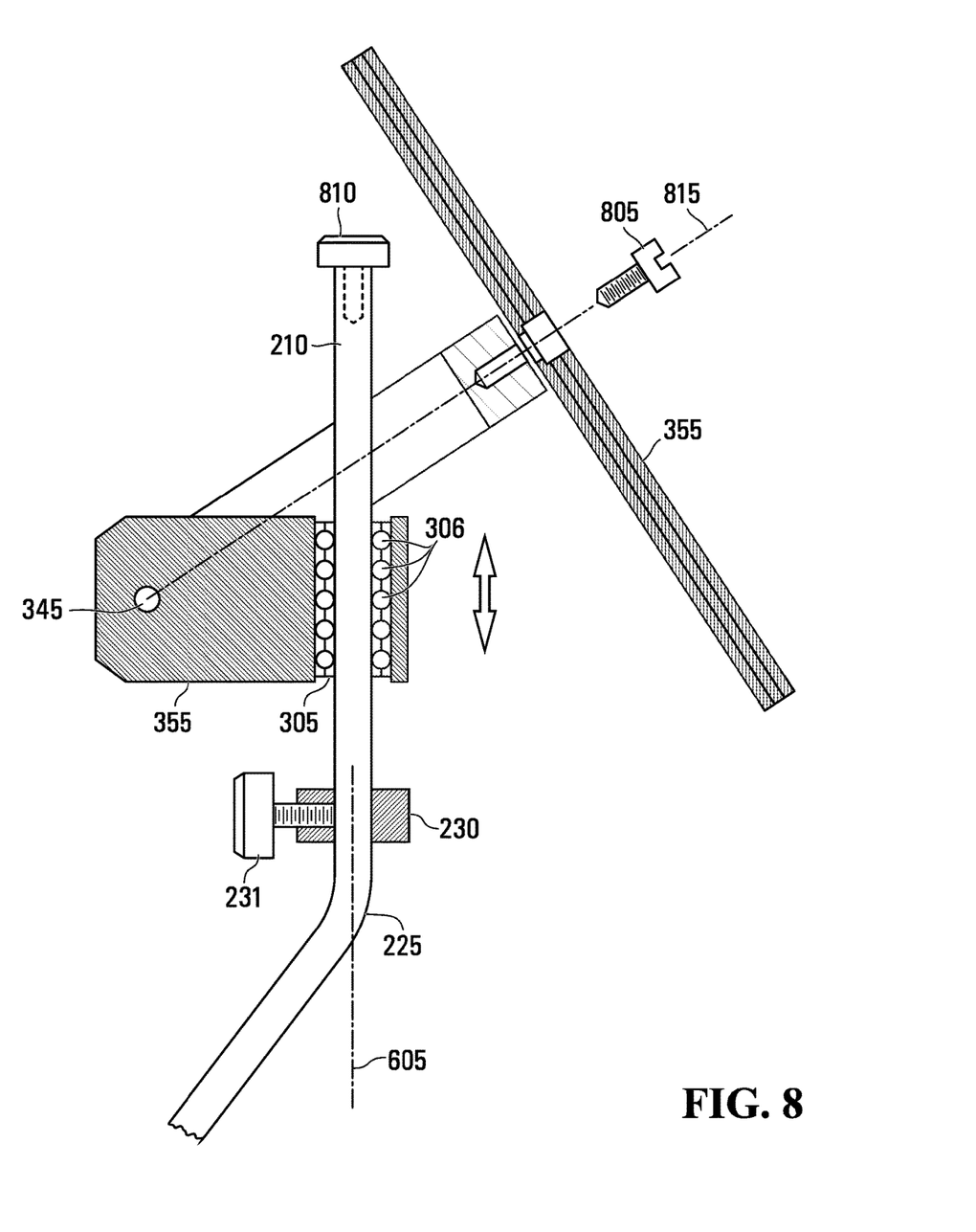
FIG. 8 shows a side elevational cross-sectional view of the static test head of the aircraft static test adapter assembly of FIG. 2 with certain elements omitted for clarity.

At the very tip of the biasing arm 210 another stopping mechanism may be provided to prevent the static test head 205 from escaping the biasing arm 210. in this example an end-cap 810 is used, as shown in FIG. 8.

In order to hinder vertical sliding of the static test head 205 with respect to the biasing arm 210, a setup stop 231 is provided in the form of a movable ring around the biasing arm 210 which can be locked in place using a tightening screw 231 that is similar to the tightening screws 221 of the inter-assembling rods 220. When vertical, the static test head 205 will tend to slide down the biasing arm 210 under its own weight until it reaches the setup stop 231. The tightening screw 231 can be tightened to provide resistance to vertical sliding so as to prevent the static test head 205 from sliding down the biasing arm 210 when not in use. Optionally, this tightening screw 231 may be tightened just enough to prevent sliding under the static test head 205's own weight but not so tightly as to prevent sliding under the force of the aircraft moving down. Preferably, however, the tightening screw 231 may be tightened for installation and loosened when the static test head 205 is firmly in place. Once loosened, the setup stop 230 may be moved out of the way of the static test head 205 and optionally re-tightened to allow the static test head 205 to move up and down with the aircraft. Alternatively, the tightening screw 231 may be provided directly on the static test head 205.

Returning to FIG. 3, the static test head 205 comprises a static test opening 315 which is defined about an axis 316, a conduit opening 320 and a sealed air passage 325 defined between the static test opening 315 and the conduit opening 320. The static test opening 315, conduit opening 320 and sealed air passage 325 are defined in a static test head block 350 that are mounted on a head rail 355.

The static test opening 315 is for facing the static port 115 of the static vent 105 so as to communicate with the static port to provide pressure thereto. The pressure may be a positive pressure, that is a pressure greater than ambient air pressure, or a negative pressure, that is a pressure less than ambient air pressure—or partial vacuum, depending on the test being run.

The test adapter 200 also comprises a seal 310, which is in continuous contact with the static test head 205 about the axis 316 such that when pressed against the aircraft body 100 around the aircraft static port 115, the seal may create a sealed passage between the static test opening 315 and the aircraft static port 115. In this particular example, the seal 310 is provided on an aircraft-facing side 360 of the static test head 205 (that is, on a side configured for facing the aircraft body 100 in use) and more precisely here of the static test head block 350. The seal may be made of any suitable material, preferably having some deformability and resilience to provide good contact. For example, a closed-cell foam may be used.

In this example, the static test head 205 comprises a mounting structure 330 which comprises a bearing block 335, a pivot arm 340 and a mounting rail. The mounting structure 330 allows fine movement of the static test head 205 and components thereof relative to the biasing arm 210.

Specifically, the bearing block 335 comprises the arm-receiving passageway 305 through which the biasing arm is received and which forms the connection between the static test head 205 and the biasing arm 210. In alternate embodiments, other connections may be provided such as a ball-and-socket connection, which may not provide relative vertical displacement between the static test head 205 and the biasing arm 210 but could provide the pivoting performed by the pivot arm 340 thereby eliminating the need therefor. Other connections possible include a rail and trolley system or the like. Alternatively still, the connection could be a solid connection allowing no movement between the static test head 205 and the biasing arm 210, such as a welded connection or a solid connection effected by fasteners.

The pivot arm 340 is pivotably connected to the bearing block 330 by a pivoting connection 345. In this example the axis of rotation of the pivoting connection is generally perpendicular to the arm-receiving passageway 305 (and therefore to the direction of vertical movement allowed between the static test head 205 and the biasing arm 210)

and generally parallel to the aircraft body 100 and/or to the ground 215. This allows the static test head 205's aircraft-facing side to tilt to accommodate an angle of the aircraft body 100 if the static vent 105 is not located on a portion of the aircraft body that is perpendicular to the ground 215. This is better shown in FIG. 6, where the pivoting arm 340 is slightly pivoted upwards with respect to the bearing block 335 so as to provide the aircraft-facing side 360 a slightly upward-facing angle relative to an axis 605 of the biasing arm 210, which in this example is a vertical axis. This allows the static test head 205 to better abut against the aircraft body 100 at a location that has a matching angle, e.g. if the static vent 105 is provided slightly below the point where the aircraft body 100 is perpendicular to the ground 215.

Thus the test adapter 200 of the illustrated example provides of the present example provides at least two-degrees-of-freedom motion of the static test head 205 which allows for better positioning of the static test head 205 with respect to the aircraft body 100 and the static port 115. The two-degrees of freedom are afforded here by a pair of mobile connections each providing a respective degree of freedom including one translating connection and one pivoting connection. The two mobile connections are also illustrated in FIG. 8.

The head rail 355 is mounted to the pivot arm 340 by any suitable connection, in this example by a threaded fastener 805. The head rail 355 is used to mount the static test head block 350, and allows positioning of one or more static test head blocks 350 (and connected seals 310) on the static test head 205 so as to allow different configurations. As shown in FIG. 8, the head rail 355 may be mounted perpendicularly to the pivot arm 340. However, the head rail 355 may be repositionable with respect to the pivot arm 340, for example to turn it relative to an axis 815 of the pivot arm 340. This may be effected, in this example by releasing the fastener 805, turning the head rail 355, and re-tightening the fastener 805. In alternate examples, sufficient resistance may be provided in the connection between the head rail 355 and the pivot arm 340 to allow turning the head rail 355 with application of force while keeping the head rail 355 in place during use.

The static test head blocks 350 may be connected to the head rail 355 by any suitable connection. Here they are connected by a rail and trolley system whereby they can slide along the head rail 355. A tightening screw (not shown) may be used to keep them in place, or any other immobilizing mechanism may be used. Alternatively, they may be fitted with sufficient friction to allow movement under force while keeping them in place in use. Alternatively still they may be connected permanently in place on the head rail 355, e.g. by gluing, welding or using a suitable fastener.

Figure 7A:
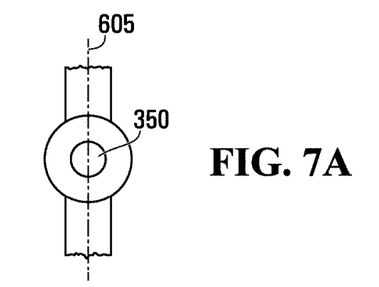
FIG. 7A shows a front elevational view of a static test head according to one exemplary configuration.
Figure 7B:
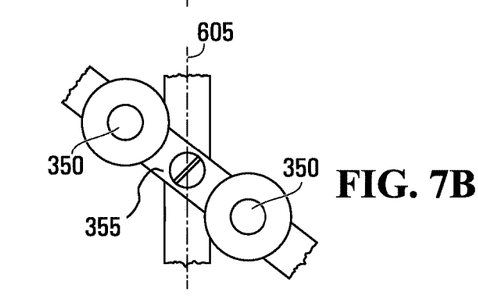
FIG. 7B shows a front elevational view of a static test head according to another exemplary configuration.
Figure 7C:
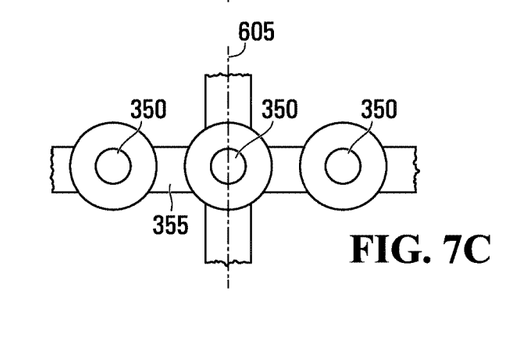
FIG. 7C shows a front elevational view of a static test head according to yet another exemplary configuration.

FIGS. 7A-7C show different possible configurations for the static test head 205. In FIG. 7A a single static test head block 350 is provided. In such a configuration, the single static test head block 350 could be mounted directly on the pivot arm 340 but in this example, it is mounted to a short head rail 355. In FIG. 7B, a pair of static test head blocks 350 are mounted to the head rail 355. These may be positioned so as to fit simultaneously over two aircraft static ports 115 of an aircraft where two ports are located side-by-side as shown in FIG. 1B. Remaining with FIG. 7B, the head rail 355 in this example has been tilted as described above, allowing it to match the positions of diagonally side-by-side static vents. FIG. 7C shows yet another configuration where three static head blocks 350 are provided on the head rail 355. Thus the rotating head rail 355 allows single or multiple head configurations adaptable to any port placement.

Figure 6:
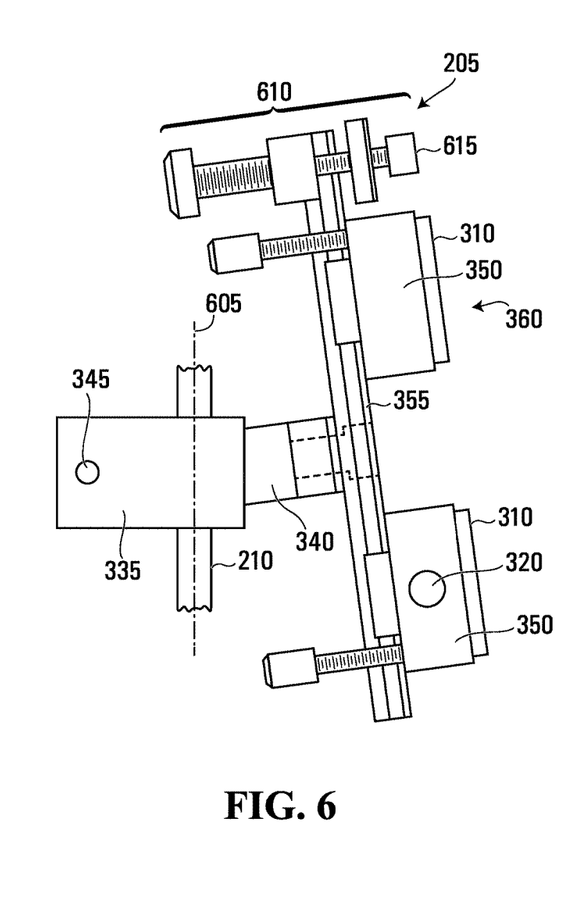
FIG. 6 shows a partial side elevational view of the static test head of the aircraft static test adapter assembly of FIG. 2.

As shown in FIG. 6, the static test head 205 also comprises a pair of outrigger assembly 610 (only one shown in FIG. 6, the other being on the other end of the head rail 355 below the static head blocks 350). The outrigger assemblies 610 are used to hold the static test head 205 against the aircraft body 100 while setting up the system. They keep the static head blocks 250 and seals 310 off the aircraft body 100 during set up and prevent head flop during application of the biasing mechanism (e.g. while tensioning member 405 is being connected). The outrigger assemblies 610 comprise retractable bumpers 615 which can be extended to further past the static head blocks 250 and/or seals 310 on the aircraft-facing side of the static test head 205 and retracted once the biasing mechanism is applied to allow the seals 310 to press up against the aircraft body 100 and create a seal around the static ports 115 and static port openings 315.

Figure 10:
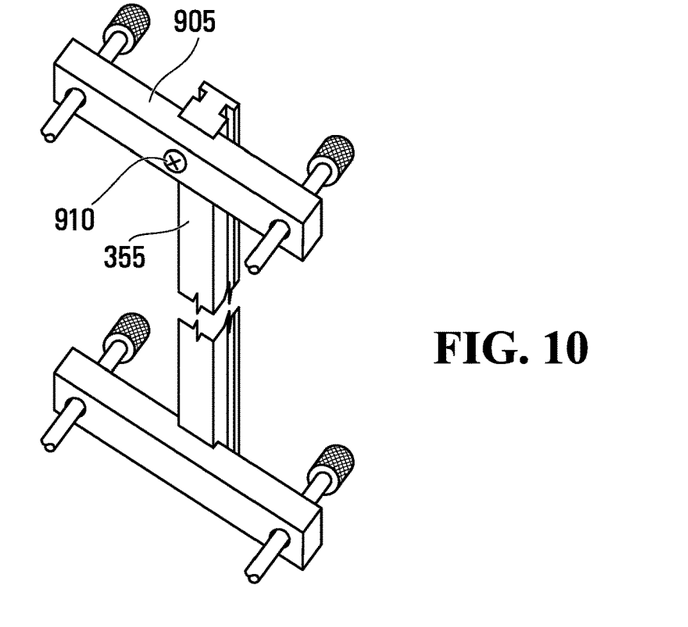
FIG. 10 shows a partial perspective view of a pair of outrigger assemblies for the aircraft static test adapter assembly of FIG. 2.

As shown in FIG. 10, the outrigger assemblies 610 may each comprise multiple bumpers 615. In this case, there are two outrigger assemblies 610 each having two bumpers 615, separated by an outrigger arm 905 upon which they are mounted. This configuration with the outrigger assemblies mounted at opposite ends of the head rail 355 provide good stability for mounting the static test head 205, however other configurations with different numbers and placements of outrigger assemblies 610 and bumpers 615 are possible.

Figure 9:
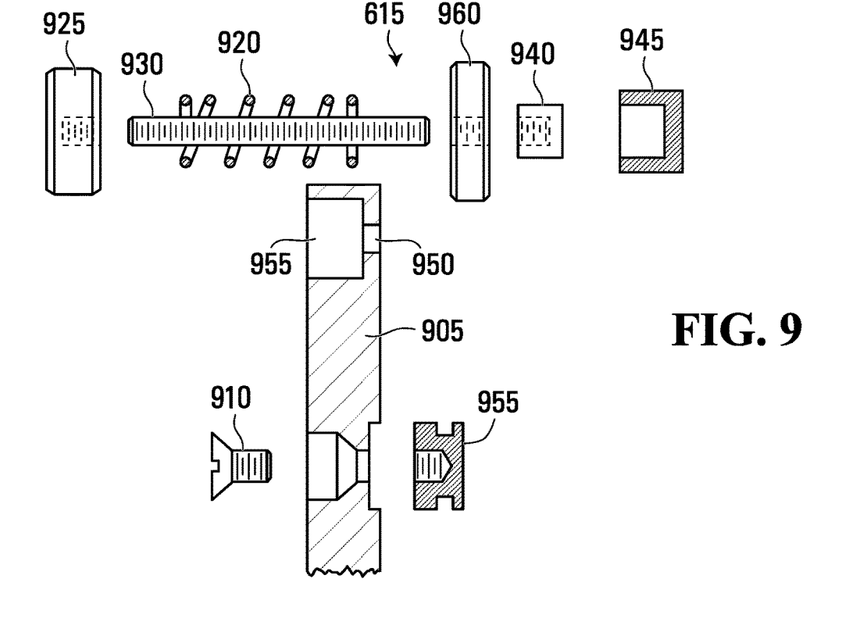
FIG. 9 shows a side elevational cross-sectional exploded view of a bumper assembly for the aircraft static test adapter assembly of FIG. 2.

FIG. 9 shows the details of a bumper 615 in a cross-sectional exploded view of a part of an outrigger assembly 610. As shown, the outrigger arm 905 may be mounted to the head rail by a suitable fastener, in this case a threaded screw 910. The bumper 615 comprises a contactor 940 covered by a rubber cover 945 to protect the aircraft body 100. The contactor 940 is mounted on a rod 930 or pin, which traverses through a corresponding opening 950 in the outrigger arm 905 and which is spring loaded by a spring 930 sandwiched between a knob 925 that is connected to the rod 930 and the outrigger arm 905 where it is received in a spring pocket 955. A dial knob 960 is threaded in a manner corresponding to a thread provided on the rod 930 such that by turning the dial knob 960, the bumper 615 can be retracted or extended. In this manner each of the bumpers 615 may be extended to protect the static test head 205 during setup, and once the test adaptor 200 is aligned and the biasing mechanism is engaged, they can be retracted to allow sealing contact of the seals 310 around the aircraft static ports 115. This bumper assembly is exemplary and it will be understood that other means of creating retractable bumpers are possible.

Figure 4:
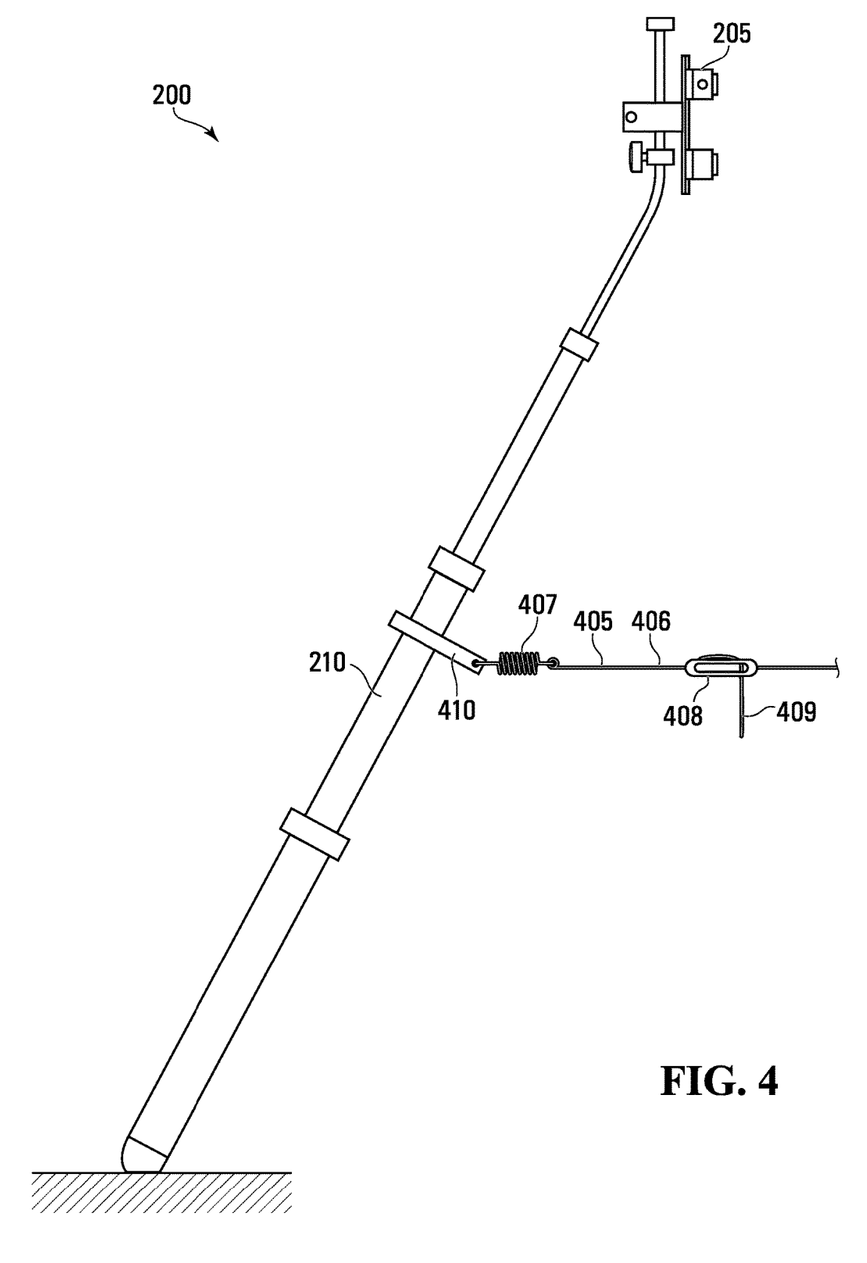
FIG. 4 shows a side elevational view of the aircraft static test adapter assembly of FIG. 2 with a tensioning member in place.

The test adapter 200 comprises a biasing mechanism which creates a biasing force pressing the static test head 205 against the aircraft body 100. In the present embodiment, the biasing mechanism applies a biasing force to the biasing arm 210 which, being at least partially rigid, transfers the biasing force to the static test head 205. FIG. 4 illustrates the test adapter 200 installed with the biasing mechanism in place.

The biasing mechanism comprises an anchor and a tensioning member 405 on which tension is applied which is transferred to the biasing arm 210 in the form of a force pulling the biasing arm 210 in a direction towards the anchor. Preferably, the anchor is installed in a direction generally towards the aircraft body 100 from the biasing arm 210 so as to pull the biasing arm 210 towards the aircraft body and so press the static test head against the aircraft body.

In the present embodiment, test adapter 200 is a first of two test adapters, the other being installed on the opposite side of the aircraft body 100. This configuration is useful for aircrafts having static vents 105 on opposite sides of the aircraft body. In the present example, the two test adapters 200 are identical, which is useful for aircraft where the static vents 105 are similarly-located on both sides (although variations in static vent locations may be adjusted for by lengthening or shortening the biasing arm 210). Alternatively a pair of asymmetrical test adapters 200 that are specially designed for particular static vent placements may be used instead.

Figure 5:
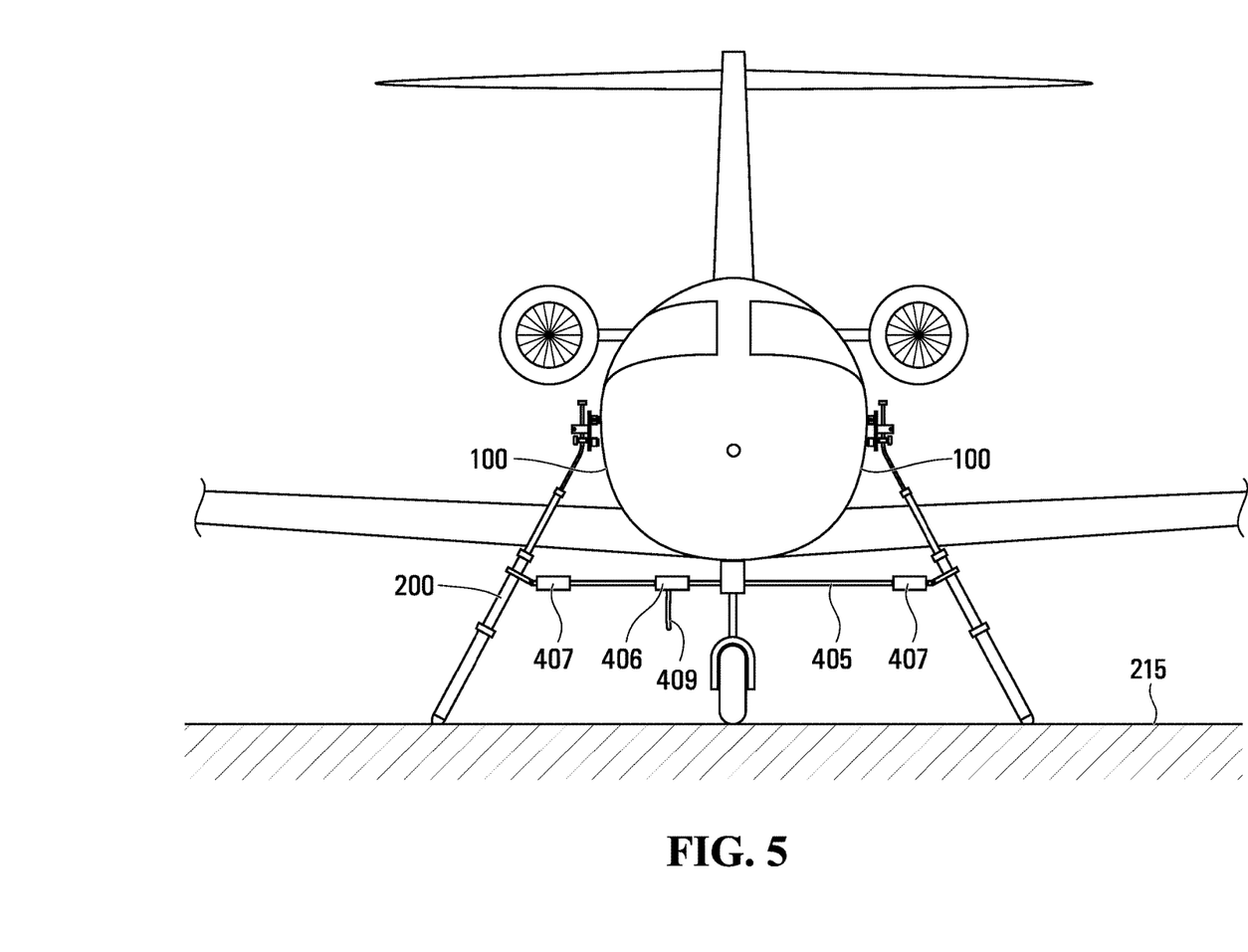
FIG. 5 shows a side elevational view of the aircraft static test adapter assembly of FIG. 1 installed on an aircraft with another aircraft static test adapter assembly.

Returning to the present example, the anchor for the first test adapter 200 shown in FIG. 4 is the second test adapter of the test adapter pair. This is shown in FIG. 5. When assembled and placed against the aircraft body 100 at opposite sides of the aircraft, the two test adapters are connected by the tensioning member 405.

In the present embodiment, the tensioning member 405 is a resilient tensioning member in that it can be deformed, particularly stretched, and resiliently resists deformation to return to its relaxed state. In the present embodiment, the tensioning member is also flexible like rope. In particular, the tensioning member comprises a cord 406 which imparts to the tensioning member its wielding character and a spring 407 which imparts to the tensioning member its resilience. Although a single spring 407 may be used, in the present embodiment there is a spring 407 on each side of the tensioning member 405, that is one for each test adapter 200.

The tensioning member 405 also comprises a catch 408 which serves to lengthen or shorten the cord 406. The catch 408 is a releasable device of any known type through which excess cord 409 can be passed and secured such that the cord 406 can be lengthened, by admitting excess cord 409 into the system, or shortened, by pulling and holding excess cord 409 out through the catch 408. Advantageously, the catch 408 allows the system to be set up without tension in the tensioning member 405, by paying out sufficient excess cord 409, and the system to be biased once in place by the tightening of the tensioning member 405 by pulling out excess cord 409. Other tension-releasing mechanisms are possible such as a detachable arrangement whereby the tensioning member 405 can be detached from the test adaptor 200 or from the anchor.

Shown in FIG. 4 is one example of a tensioning member 405, however other implementations are possible. For example, rather than to provide a combination of spring 407 and cord 405, a resilient cord, such as is used in bungee cord fasteners may be used instead (with or without a catch 408 or similar mechanism).

Preferably, the test adapter 200 comprises an attachment point 410 for attaching the tensioning member 405 to the test adaptor 200. In the present embodiment, the attachment point 410 is provided on the biasing member 210 by an extension comprising an aperture for receiving a hook in which the tensioning member 405 terminates. In other embodiments, other ways of providing an attachment point suited to the particular tensioning member provided may be used (e.g. D-ring, cord-clasp, etc. . . . )

Although in the described embodiment, the two test adapters are used for testing, in other examples the second test adapter may be positioned as shown in on the opposite side of the aircraft merely to hold the first test adapter 200 in place to perform testing.

Although in the present embodiment the anchor for the test adapter 200 of FIG. 4 is another test adapter, in other embodiments other anchors may be used. For example, a D-ring or the like secured to the ground 215 may be used provided that one is located at a suitable location, preferably away from the biasing arm 210 in direction towards the aircraft body 100 from the biasing arm (although this may be past the aircraft over on the other side of it). In another embodiment, the anchor may be provided by a ground-supported weight, which may be any sufficiently heavy device that can be held in place on the ground by its own weight. Such an anchor might be a sufficiently heavy container comprising heavy material (e.g. sand or ball bearings), preferably having an attachment point (such as a D-ring or the like) to which the tensioning member 405 may be secured.

In yet another embodiment, the anchor may be provided integrally with the biasing arm 210. For example, the ground-contacting portion of the biasing arm 210 may terminate in a rigid extension extending away from the first end 211, preferably in a direction towards the aircraft body 100 along the ground, giving the test adaptor 200 a rough L shape. In such an embodiment, the anchor may be provided by the rigid extension, e.g. in the form of an attachment point on the rigid extension for the tensioning member 405. The attachment point may be provided as a D-ring or the like, as an extension like the attachment point 410, or in other ways. Thus the tensioning member 405 may be anchored to a base of the biasing arm 210. Other types of bases, besides the rigid extension are possible.

In yet another embodiment the biasing mechanism may include a resilient articulation such as a leaf spring. For example, in a variation on the above example where the biasing arm 210 terminates in an extension giving it an approximate L shape, the link between biasing arm 210 and the extension may be a resilient hinge, such as a leaf spring, or an otherwise-biased hinge such that the biasing arm is subjected to a biasing force torquing it relative to the extension. Another torquing mechanism, a torquing member may be provided that is connected at one point to an anchor and at another point to the biasing arm (the torquing action being defined between these two points) so as to create a bias on the biasing arm 210 relative to the anchor. For example, a coil spring may be used as a torquing member of which one end is connected to the ground, to a base, extension or other anchor, and of which the other end is connected to the biasing arm 210. In this example, the coil spring may be at rest when the biasing arm 210 is angled more towards the direction of the plane body 100 (or more in the direction of the working side of the static test head 205 than it would be in use). That way, angling the biasing arm to rest the static test head 205 against the aircraft body 100 causes deformation of the coil spring that is resisted by the coil spring, providing a biasing force that is transferred by the biasing arm 210 to the static test head 205.

Finally, although in the above examples, the biasing mechanism tend to pull the biasing arm 210 towards the aircraft body 100, in alternate embodiments, a pushing force (i.e. compression) may be applied too. For example, the biasing arm 210 may be hinged onto a wide base whereupon a spring or other resilient mechanism resisting motion in one direction may be provided on the opposite side to the working side of the static test head 205 such that the biasing arm 210 is biased in a direction towards the working side of the static test head, as above. Specifically a compression member such as a resilient spring which resists compression may be provided on the opposite side of the biasing arm 210 from the working side of the static test head 205, that is on the opposite side of the aircraft body 210 in use, such that when at rest, the biasing arm 210 is angled more towards the direction of the plane body 100 (or more in the direction of the working side of the static test head 205 than it would be in use). That way, angling the biasing arm to rest the static test head 205 against the aircraft body 100 causes compression of the compression member that is resisted by the compression member, providing a biasing force that is transferred by the biasing arm 210 to the static test head 205.

The compression member may be connected at one end to the biasing arm 210, e.g. like the tensioning member 405 described above, and at the other end to an anchor, and provide a biasing force pushing the biasing arm towards the aircraft body 100. In one example, the anchor may be provided by the ground, or by a ground-supported base or extension of the types described above. However, this may result in a non-normal angle between the compression member and the biasing arm 210. To provide a closer-to-normal angle, an anchor may comprise a vertical extension extending upwards to an anchor point such that the compression member is anchored higher relative to the base of the biasing arm. The vertical extension may be provided separately from the biasing arm, e.g. on its own base, or may be connected to the biasing arm by a ground-supported extension or base. In one example, a vertical extension, ground-supported base, and biasing arm 210 together form an approximate U shape.

In many of the above examples, the biasing force is provided in part by a force resulting from a deformation of a biasing member, e.g. a resilient tensioning member, resilient torquing member or resilient compression member. However, it should be noted that resilience is not necessarily required in the biasing member. For example a motor or actuator may cause the pulling, torquing or pushing of the biasing arm 210. Moreover, resilience may be provided in the biasing arm 210 itself.

Specifically, the biasing arm 210 may be made of a flexible resilient material that can be bent but that resists deformation and tends to return to its original shape. For example, in a tent pole-like embodiment, the biasing arm 210 may be made of sturdy resilient material and be made up of inter-assembling rods 220 that connect in a tent pole-like assembly.

A flexible resilient biasing arm 210 may bend under biasing action when the biasing action is resisted by the aircraft body 100. When the static test head 205 is pressed against the aircraft body 100, e.g. at the static air vent 105, a biasing action on the biasing arm 210 pulls the biasing arm so as to make the static test head 205 press harder against the aircraft body 100 leading to the bending of the biasing arm 210. Such bending may contribute to the biasing since the bending is resiliently resisted by the biasing arm 210, leading to force being applied to the static test head 205 which in turn leads to pressure being applied by the static test head 205 onto the aircraft body 100.

Thus a biasing mechanism may include a biasing force-imparting component and a flexible resilient biasing arm.

In yet another embodiment, resilience may be provided elsewhere in the system, for example the seal 310 may be made extra thick and resilient, and may itself contribute resilience that resists a biasing force that is transferred from the biasing arm 210 forcing the static test head 205 against the aircraft body 100.

Many different sources of resilience in the system have been described, it should be understood that a test adapter 200 may include several of these sources in combination.

The biasing arm 210 has been described and illustrated as a pole-like structure. It will be appreciated that this particular shape is not required. Indeed the biasing arm can take other shapes provided that it can extend from the ground up to the static test head 205.

Moreover, although the in the above examples, the biasing force was applied to the biasing arm 210, in alternate examples, this force may be applied directly to the static test head 205, in which case the biasing arm 210 takes the role of a support arm holding the static test head 205 in place, e.g. during installation. For example, in the variant where the biasing force is applied by a compression member anchored to a vertical extension, the anchor may be provided roughly at the height of the static vent 105 and the compression member can be connected directly to the static test head 205 so as to press the static test head against the aircraft body 100 directly.

Although a single arm was provided in the illustrated embodiments, it should be appreciated that multiple biasing or support arms may be provided. For example, two arms may extend down from the static test head 205 to the ground 215. Both arms may be biased (e.g. with their own respective biasing member) or only one, the other serving as a support arm.

In the present example, the test adapter 200 is conveniently provided in a box dimensioned to be smaller than the fully-extended biasing arm 210. In particular, in this example, the biasing arm is packaged in a box measuring only a bit over 1 meter (e.g. 110 cm) in its longest dimension and it can receive fully the test adapter 200 when retracted/disassembled. The box may comprise padding to prevent movement of its contents and in one example it comprises foam padding that is cut away in the shape of the retraced biasing arm 210 and static test head 205. If the static test head 205 is detachable (e.g. if the end cap 810 is removable to slide the static test head 205 out), then a separate cut-out may be provided for the static test head.

It will be appreciated that the present equipment may be used to implement an novel static testing method.

In one example, the static test head 205 may optionally first be set up by extending the bumpers 615 to beyond the reach of the one or more seals 310 or at least of the one or more static test head blocks 350. The static test head 205 is positioned against the aircraft body such that the one or more seals 310 surround their respective aircraft static ports 115. Although the seals surround the aircraft static port about an axis, they are not necessarily contacting the aircraft body 100 yet, since the bumpers 615 may be extended.

The biasing arm 210, if not connected is then connected to the static test head 205, e.g. by removing removable end cap 810 if present and sliding biasing arm 210 through static test head 205, and more specifically here through the bearing block 335. The biasing arm 210 is also extended or assembled, if extendible or assemblable, which may be done at any point before positioning it. The biasing arm 210 is then positioned such that its first end contacts the ground 215 at the ground-contacting portion 214.

The biasing mechanism is then engaged to bias the biasing arm towards the aircraft body 100. This may involve connecting a biasing member, such as a tensioning member 405, to the biasing arm 210 and/or to an anchor, which may be another biasing arm. This may also involve tensioning a tensioning member 405, e.g. by taking in slack in a cord. A biasing force is then applied to the biasing member which is transferred to the static test head 205 by the biasing member.

At this point or earlier, an air conduit from the static testing equipment may be connected at the conduit opening.

After the biasing mechanism is engaged the bumpers 615, if present may be retracted or generally moved out of the way to allow the one or more seals 310 to press against the aircraft body 100 under the biasing force transferred by the biasing member to the static test head 205. The seals 310 thus create a sealed passage between the static test opening (s) 315 and the aircraft static port(s) 115.

Once the test adaptor 200 system in place, the static test equipment (e.g. of types known in the art), which may comprise a pressure difference source connected to the air conduit, may be engaged to provide pressure (negative or positive) to the aircraft static port(s) 115 through the air conduits and the static test head 205. Thus testing is performed on the aircraft static port with the test adaptor 200.

To disengage, the reverse method may take place although using the bumpers 615 may be omitted in certain cases while disengaging the test adaptor.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. An aircraft static test adapter assembly for applying static test equipment to an aircraft static vent comprising:
    a static test head comprising
        a static test opening defined about an axis adapted for communicating with an aircraft static port of an aircraft;
        a conduit opening for connecting to an air conduit providing pressure; and
        a sealed air passage defined between the static test opening and the conduit opening;
    a seal in continuous contact with said static test head around said static test opening about said axis, the seal being adapted for pressing against an aircraft body around the aircraft static port to create a sealed passage between the static test opening and the aircraft static port; and
    a biasing arm for transmitting a force to the static test head, the biasing arm having a first end and a second end and comprising at a second end a connection for connecting to the static test head and extending longitudinal away from the second end to a first end, the first end comprising a ground contacting portion adapted for resting against a ground surface.

2. The aircraft static test adapter of claim 1, further comprising a biasing mechanism for creating a biasing force on the biasing arm for transfer to the static test head to push the static test head against the aircraft.

3. The aircraft static test adapter of claim 1, further comprising a biasing mechanism comprising:
    an anchor positionable away from the biasing arm in a direction towards the aircraft from the biasing arm; and
    a tensioning member for applying a biasing force on the biasing arm for transfer to the static test head, the tensioning member being connectable at an anchor end to the anchor and connectable at an arm end to the biasing arm between the second end and the first end.

4. The aircraft static test adapter of claim 3, wherein the tensioning member comprises a cord and a spring adapted for being stretched between the biasing arm and the anchor so as to apply the biasing force by an elastomeric resilience pulling the biasing arm towards the anchor.

5. The aircraft static test adapter of claim 3, wherein the biasing arm is a resilient flexible arm, and wherein the tensioning member comprises a cord the tightness of which is adjustable so as to apply the biasing force to the biasing arm to bend the biasing arm towards the aircraft.

6. The aircraft static test adapter of claim 3, wherein the anchor comprises a ground-supportable weight.

7. The aircraft static test adapter of claim 3, wherein the aircraft static test adapter is a first aircraft static test adapter, wherein the anchor comprises a second aircraft static test adapter having a second biasing arm positionable on an opposite side of the aircraft and wherein the tensioning member is affixable to the first aircraft static test adapter and to the second aircraft static test adapter in a taught arrangement so as to apply tension on both the first and the second aircraft static test adapters pulling each towards the aircraft.

8. The aircraft static test adapter of claim 1, wherein the biasing arm comprises a plurality of inter-assembling rods connectable together to form a single arm extending from the ground at the first end towards the aircraft at the second end at a height allowing the seal to rest against the aircraft body and surround the aircraft static port.

9. The aircraft static test adapter of claim 8, provided in a storage box wherein the inter-assembling rods are collapsible, and wherein the inter-assembling rods are collapsed to fit into the storage box.

10. The aircraft static test adapter of claim 1, wherein said connection comprises a sliding contact between the static test head and the biasing arm such as to allow, in use, generally vertical sliding of the static test head with respect to the biasing arm to accommodate vertical movement of the aircraft body.

11. The aircraft static test adapter of claim 1, wherein said connection is a permanent connection.

12. The aircraft static test adapter of claim 1, further comprising the air conduit, wherein the air conduit is a flexible hose.

13. The aircraft static testing device comprising a pressure difference source adapted for creating a pressure that is greater or less than ambient air pressure, the static testing device comprising the aircraft static test adapter of claim 1, wherein the air conduit is in sealed communication with the pressure difference source to communicate the pressure created by the pressure difference source to the static test opening.

14. A method for performing a test on an aircraft static port of an aircraft pitot-static system comprising:
    positioning a static test head having a static test opening surrounded by a seal against an aircraft body such that the seal surrounds the aircraft static port;
    positioning a biasing arm having a first end and a second end and connected to the static test head at the second end such that the first end contacts the ground;
    biasing the biasing arm in a direction towards the aircraft body such that a biasing force is transferred to the static test head pressing the static test head against the aircraft body.

15. The method of claim 14, wherein biasing the arm comprises providing a biasing member connected to the biasing arm and to an anchor.

16. The method of claim 15, wherein the biasing member is a tensioning member.

17. The method of claim 16, wherein biasing the biasing arm comprises connecting the tensioning member to the biasing arm.

18. The method of claim 16, wherein biasing the biasing arm comprises tightening a cord in the biasing member.

19. The method of claim 14, wherein the static test head comprises a conduit opening in sealed communication with the static test opening, the method further comprising connecting an air conduit to the static test head in a sealed connection at the conduit opening.

20. The method of claim 14, further comprising performing testing on the aircraft static port by providing a pressure difference to the static test opening when the static test head is positioned and the biasing arm is biased.

21. The method of claim 14, further comprising extending one or more retractable bumpers on the static test head prior to engaging the biasing arm and retracting the one or more retractable bumper after biasing the biasing arm until the seal surrounding the aircraft static port contacts the aircraft body around the aircraft static port.

22. An aircraft static test adapter assembly for applying static test equipment to an aircraft static vent comprising:
   a static test head means comprising means for establishing a sealed contact between an air conduit and an aircraft static port on an aircraft body;
   a biasing arm means mountable between a ground-based support to the static test head for transferring a biasing force to the static test head means; and
   a biasing means for providing a biasing force to the biasing arm means, the biasing force forcing the biasing arm in a direction toward the aircraft body.

23. The aircraft static test adapter of claim 22, wherein the biasing means comprises:
   a biasing member for applying the biasing force to the biasing means; and
   an anchor means connected to the biasing means with respect to which the biasing member applies the biasing force to the biasing member.

24. The aircraft static test adapter of claim 23, wherein the biasing force is one of a tensioning, compressing, and torquing force.

25. The aircraft static test adapter of claim 22, wherein the biasing means comprises an assembly means by which the biasing means is assembled to a full size.

26. The aircraft static test adapter of claim 22, further comprising a mobile connection means between the static test head means and the biasing means allowing relative movement of the static test head means relative to the biasing means.

27. The aircraft static test adapter of claim 26, wherein the mobile connection means is a two-degrees-of-freedom mobile connection means allowing relative movement of the static test head means relative to the biasing means in two degrees of freedom.

28. The aircraft static test adapter of claim 22, further comprising the air conduit means connected to the static test head means.

29. The aircraft static test adapter of claim 22, further comprising the static test equipment means for performing a test on the aircraft static port.

* * * * *